United States Patent [19]

Weirich

[11] 4,267,998
[45] May 19, 1981

[54] STAND

[76] Inventor: James F. Weirich, 200 Posada Del Sol #40, Novato, Calif. 94947

[21] Appl. No.: 59,312

[22] Filed: Jul. 20, 1979

[51] Int. Cl.³ ........................................ F16M 11/32
[52] U.S. Cl. .................................... 248/165; 108/153; 248/174
[58] Field of Search ............... 248/166, 165, 169, 174, 248/529, 188.7; 108/153

[56] References Cited

U.S. PATENT DOCUMENTS

| | | | |
|---|---|---|---|
| 1,013,813 | 1/1912 | Pettibone | 248/165 X |
| 1,332,402 | 3/1920 | Krabol | 248/188.7 |
| 1,422,933 | 7/1922 | Dawson | 248/188.7 |
| 2,481,671 | 9/1949 | John et al. | 108/153 X |
| 2,551,071 | 5/1951 | Tyng | 108/153 X |
| 3,566,808 | 3/1971 | Slate | 108/153 |
| 3,983,824 | 10/1976 | Birnbaum | 108/153 X |
| 4,014,270 | 3/1977 | King | 108/153 X |
| 4,128,063 | 12/1978 | Avery | 248/165 X |

FOREIGN PATENT DOCUMENTS

| | | | |
|---|---|---|---|
| 107371 | 10/1924 | Switzerland | 108/153 |
| 480626 | 2/1938 | United Kingdom | 108/153 |
| 815722 | 7/1959 | United Kingdom | 108/153 |

Primary Examiner—J. Franklin Foss
Attorney, Agent, or Firm—Owen, Wickersham & Erickson

[57] ABSTRACT

A load supporting and elevating stand capable of quick assembly, without fasteners or gluing, is made up of a series of flat panels. The preferably wooden panels are rectangular and relatively thin, and can be stored and shipped flat and compactly. Slots in the two leg-member panels enable them to be interlocked to form a supporting base. Grooves in these two panels slidably receive four vertical brace panels, rigidifying and locking the base in the desired configuration. A top panel rests horizontally on the base, with grooves in the underside of the top panel receiving the top edges of the interlocked leg-member panels, increasing stability and locking the top panel in place.

4 Claims, 6 Drawing Figures

STAND

BACKGROUND OF THE INVENTION

The invention relates to load supporting and elevating apparatus, and more particularly to a quickly assembled stand or platform which may be used to support a load such as a water heater at an elevated position, and to a kit or package of slotted and grooved panels which assemble into the stand.

To reduce the hazard of fire, particularly from gasoline fumes, water heaters installed in residential garages are required to be at an elevated position above the garage floor. Several types of stands for garage water heaters have been used, usually taking the form of wooden or metal box-like structures having four peripheral walls and a platform top. The pre-assembled stands are bulky and not easily or economically transported or stored. Their assembly, which is normally done at the producing plant, is permanent and involves costly steps which are avoided by the present invention described below.

SUMMARY OF THE INVENTION

The present invention provides a stand which is very quickly assembled from a series of flat panels which may be of relatively thin plywood, for example. The panels are slotted and grooved in such a way as to permit assembly in a minute or less without fasteners, glue or other materials, and the completed stand has surprisingly high load-supporting capability.

The flat panels which make up the stand are manufactured simply, by several saw cuts and dado grooving when wood is used, and the panels store quite compactly and produce maximum efficiency in shipping. When they are to be assembled, one simply interlocks two leg-member panels which are appropriately slotted, slides in four brace panels and lays a top panel in place.

The stand of the invention is useful not only as a water heater elevating stand, but also as a general purpose stand or stool. It may be used for any type of elevated storage, as an outdoor seat, a stepping stool, etc. In some applications it is desirable to dismantle the stand after use or between uses, and this is a simple matter which can be accomplished in a few seconds.

Accordingly, in one embodiment a stand according to the invention for providing an elevated load-supporting surface comprises; a pair of interlocked panels in an X configuration, each being generally flat and rectangular and oriented generally in a vertical plane; a top panel positioned horizontally on the upper edges of the interlocked panels, with grooves formed in the underside of the top panel for receiving said upper edges to retain the top panel in position, preventing side-to-side movement; and stabilizing brace means connected to the two interlocked panels below the top panel.

It is therefore among the objects of the invention to provide a series of panels which are quickly assembled together by interlocking and engagement together in a unique way to form sturdy, high-capacity load supporting and elevating stand. No gluing or fasteners are required yet the assembled stand is at least as sturdy as any previous device utilizing a comparable quantity of materials. These and other objects, advantages and features of the invention will be apparent from the following description of a preferred embodiment, taken in conjunction with the drawing.

DESCRIPTION OF A PREFERRED EMBODIMENT

Figure 6:
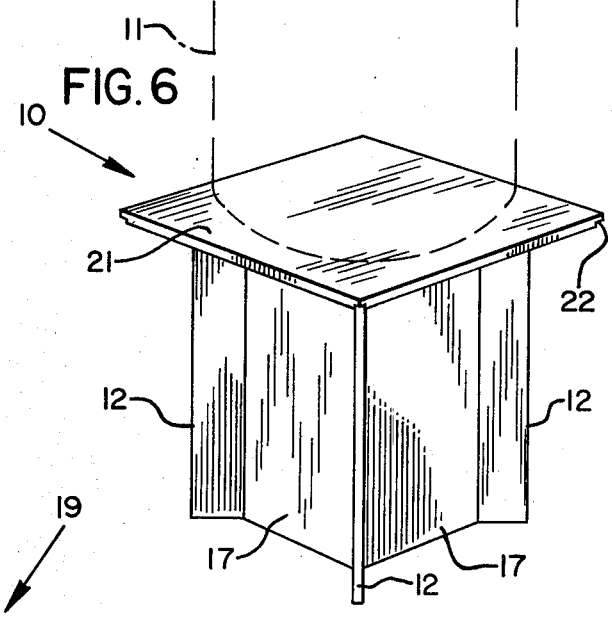
FIG. 6 is a perspective view showing the completed stand supporting a water heater or other object at the prescribed level.

In the drawings, an assembled load supporting and elevating stand 10 is shown in FIG. 6, supporting a water heater 11, for example, at an elevated position. The stand 10 is made up of a series of quickly assembled, interconnected panels, the assembly of which is described with reference to FIGS. 1-5. Both the assembled stand and the series of interrelated panels which assemble together into the stand, form the subject matter of the invention.

Figure 1:
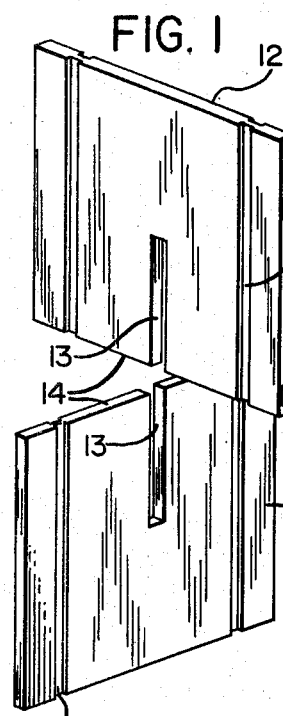
FIG. 1 is a perspective view showing a pair of leg-member panels as they are assembled together to form a base for a stand according to the invention.

FIG. 1 shows a pair of preferably identical leg-member panels 12, which may be formed of any suitable material such as wood plastic or metal, but which preferably comprise cut plywood pieces. Each panel 12 includes a slot 13 extending into the panel from one edge 14 approximately half way, as shown. Each slot 13 accommodates the thickness and non-slotted depth of the opposing panel 12, so that the two panels 12 can be fit together in the well-known interlocking manner. Of course, one slot 13 may extend more deeply into one panel 12, in which case the other slot 13 may extend less deeply; but for maximum strength and ease of manufacture, involving identical components 12, these slots in the preferred form of the invention each extend approximately half way into the panel, or slightly more than half way if desired to assure that proper assembly is possible.

Each leg-member panel 12 also includes generally vertically extending grooves 16 in each face. Preferably four such grooves are included in each panel 12, two on each face, although fewer may be sufficient under some circumstances as will be explained below. Such grooves can be formed in a conventional way, as by use of a dado cutting blade where wood is used as the panel material. The grooves may comprise simple rectangularly formed channels in the faces of the panel 12, and they may be relatively shallow, e.g. ⅛ inch deep.

Figure 2:
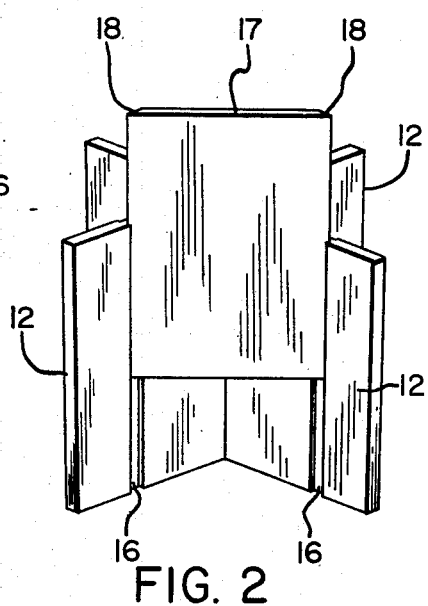
FIG. 2 is a similar perspective view showing brace panels being installed.

FIG. 2 shows the two leg-member panels 12 assembled together in interlocking relationship, forming an X-shaped configuration. Also shown is one of a plurality of brace panels 17, as it is assembled by sliding fit into the grooves 16 of adjacent faces of the panels 12. A brace panel 17 may be of the same material as the leg-member panel 12, and each panel 17 has a pair of converging angled side edges 18 as illustrated, formed, for example, by a 45°-angled saw cut in the case of wooden panels being used. The angled side edges 18 should be cut to fit against the bottoms or inner surfaces of the channel-like grooves 16 in generally parallel relationship, in a close fit. If, for example, the panels 12 and 17 are all of ⅜ inch thick material, a 45°-angled cut at the edges 18 will fit closely and securely into grooves 16 which are one inch wide and ⅛ inch deep. The grooves 16 in the panels 12 need not be formed angularly to accommodate the angle of the brace panel 17, although they can be so formed if desired.

Figure 3:
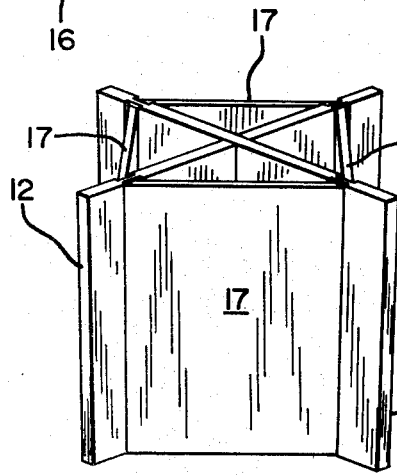
FIG. 3 is a similar view with all brace panels installed in the completed base.

FIG. 3 shows the assembled panels 12 and 17, forming a completed base 19 for the stand 10. As indicated, the brace panels 17 preferably are of somewhat less height than the leg-member panels 12, so that the upper edges of the panels 12 extend a short distance above the brace panels 17. The reason for this will be explained below.

Figure 4:
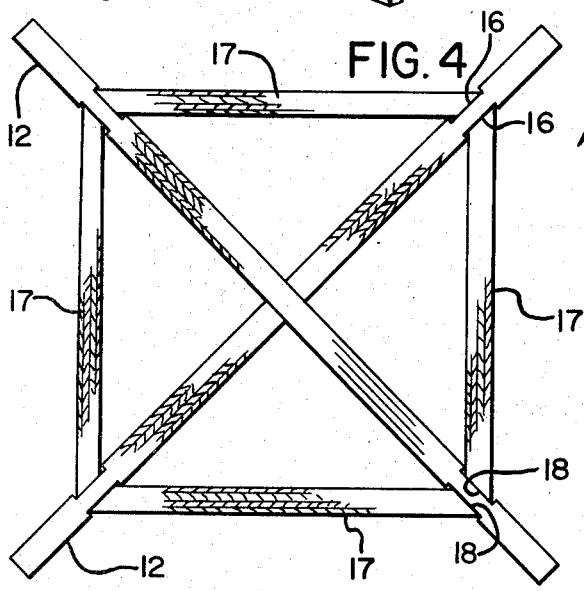
FIG. 4 is a plan view showing the assembled base.

The assembled base 19 of the stand 10 is shown in plan view in FIG. 4. A sturdy, rigid assembly results from the closely fitted relationship among the panels 12 and 17. The use of four panels 17 is preferred for maximum strength and stability, but if the leg-member panels 12 are fitted closely enough, forming a relatively rigid X-configuration, only two brace panels 17, at opposed quadrant locations on the interlocked panels 12, may be sufficient.

Figure 5:
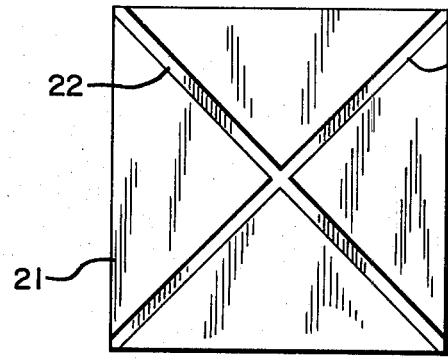
FIG. 5 is a bottom plan view of a top panel which is assembled onto the base, showing grooves in the underside of the top panel for engaging the base.

FIG. 5 shows the bottom side of a top panel 21 which is fitted onto the assembled base 19, preferably resting on the base without fasteners or other additional securing means. The underside of the top 21 includes grooves 22 as shown, in an X-formation, for receiving the top edges of the leg-member panels 12 in a relatively close fit. This adds further stability to the base and also secures the top panel 21 in position, preventing side-to-side movement of the top in the assembled stand 10. As is evident from FIGS. 3, 4 and 5, the described engagement between the upper edges of the panels 12 and the X-grooves 22 of the panel 21 is the reason for the different heights of the panels 12 and 17. The shorter panels 17 do not interfere with the fitting of the top panel grooves 22 over the top edges of the interlocked leg panels 12. Of course, if desired, additional grooves (not shown) can be formed in the underside of the top panel 21, with all base panels 12 and 17 of the same height, so that all upper edges are received by the top panel 21. However, the illustrated arrangement is preferred because it is simple, economical to produce, and more than adequate in strength and stability.

The above described preferred embodiment provides a series of simple panels which quickly interconnect in a unique manner to form a sturdy load supporting and elevating stand or stool, without fasteners, gluing or other adhering means. The stand can be dismantled quickly and easily if desired. Efficiency in storage and shipment is facilitated by the flat, relatively thin panels which stack compactly in a kit or package. Various other embodiments and variations to this preferred embodiment will be apparent to those skilled in the art and may be made without departing from the spirit and scope of the invention as defined by the following claims.

I claim:

1. A series of panels for interconnection together to form a load supporting and elevating stand, comprising:

a pair of similar leg-member panels, each being generally rectangular and having a slot extending inwardly from one edge perpendicularly to the edge, approximately half way into the panel, said slots being configured so as to permit the two leg-member panels to be interlocked together in an X-configuration;

each leg-member panel also including a pair of grooves in each of its two opposed faces, parallel to the slot and spaced outwardly therefrom;

four brace panels, each being generally rectangular and sized to fit closely between grooves of adjacent faces of the leg-member panels when they are interlocked together in the X-configuration; and a top panel sized to lie on the top edges of the leg-member panels when they are interlocked together;

whereby load supporting and elevating stand may be quickly assembled together by interlocking the leg-member panels together to form an X-shaped base, then assembling the base panels into the base by sliding them into the grooves, adding strength and stability to the base, then assembling the top panel onto the top of the base to complete the stand.

2. A series of panels according to claim 1, wherein the brace panels are of lesser height than the leg-member panels, and wherein the top panel includes on its underside a pair of grooves in an X-configuration, positioned to receive the top edges of the interlocked leg-member panels, for stabilizing the assembly and locking the top panel in place.

3. A series of panels according to claim 1, wherein grooves in the leg-member panel faces comprise channels having generally rectangular cross section, the channels extending vertically, and wherein the side edges of the brace panels are anagled and generally parallel to the inner surfaces of the channels for engagement thereagainst.

4. A series of panels according to claim 3, wherein the slots in the leg-member panels are formed so as to fit the two leg-member panels together perpendicularly, and wherein the angled side edges of the brace panels are formed at 45°.

* * * * *